May 19, 1953     P. N. HEERE     2,639,130
APPARATUS FOR EQUALIZING DISTRIBUTION IN PACKED COLUMNS
Filed Nov. 27, 1948     2 Sheets-Sheet 1

INVENTOR.
PETER N. HEERE
BY
ATTORNEY

May 19, 1953  P. N. HEERE  2,639,130
APPARATUS FOR EQUALIZING DISTRIBUTION IN PACKED COLUMNS
Filed Nov. 27, 1948  2 Sheets-Sheet 2

INVENTOR.
PETER N. HEERE
BY
*Philip S. M°Cean*
ATTORNEY

Patented May 19, 1953

2,639,130

UNITED STATES PATENT OFFICE 2,639,130

APPARATUS FOR EQUALIZING DISTRIBUTION IN PACKED COLUMNS

Peter N. Heere, South Plainfield, N. J.

Application November 27, 1948, Serial No. 62,256

1 Claim. (Cl. 261—97)

The invention herein disclosed relates to fractionation, absorption, extraction and other forms of packed towers or columns.

General objects of the invention are to effect better distribution and improve the overall performance of packed columns.

It is known that packed columns often operate inefficiently as contacting units due to channeling or by-passing occurring in the packing. A specific example is the channeling or by-passing between rising vapor and down-flowing liquid in fractionation and gas absorption and between the extract and the raffinate, in the case of liquid, to liquid absorption and extraction. The intent in a well operating column is to have the two phases well distributed over the packing so that they come in intimate contact with each other throughout the packed area.

Liquid passing down a packed column, due to various causes such as the action of the upflowing phase, the resistance of the column wall, surface tension and the action of the packing itself, tends to flow outward to the column wall and then down the wall, thus escaping direct contact with the other phase.

Particular objects of this invention are to intercept liquid flowing toward the column wall and to return it to definite predetermined points across the column area.

Further important objects of the invention are to catch liquid flowing down the column wall and redistribute it to definite predetermined points across the column area.

Related objects of the invention are to effect repetition of such diversion, collection and redistribution as much as need be to equalize distribution and to accomplish results desired in the operation of the column.

Important objects of the invention, furthermore, are to accomplish all such results with a fully practical, simple, low cost form of structure readily combined with towers of accepted design and with approved forms of packing.

The foregoing and other desirable objects are attained in this invention through the novel features of construction, combinations and relations of parts herein described in detail and illustrated by way of example in the accompanying drawings. It will be appreciated, however, as the invention is comprehended, that changes may be made in the structure, arrangement and operation, all within the true intent and broad scope of the invention as hereinafter defined and claimed.

Fig. 1 in the drawings is a horizontal cross sectional view of a typical column, showing in plan one of the distributors installed therein. This view may be considered as taken substantially on the plane of line 1—1 of Fig. 2;

Figure 1:
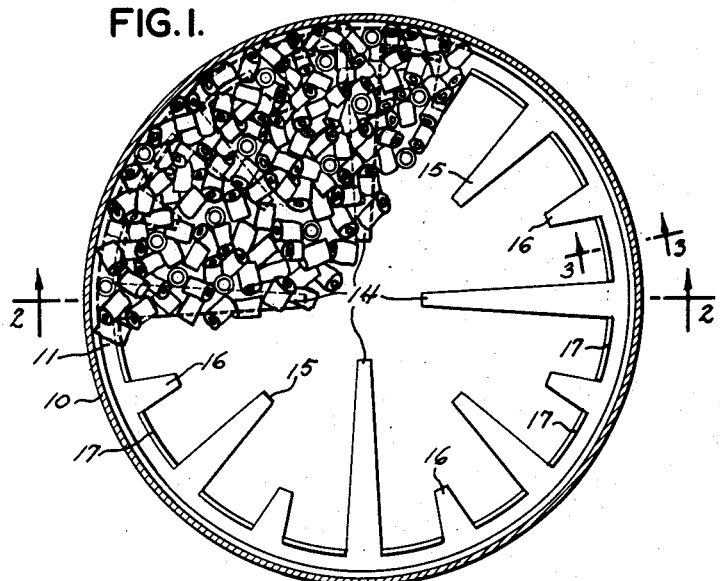
Figure 2:
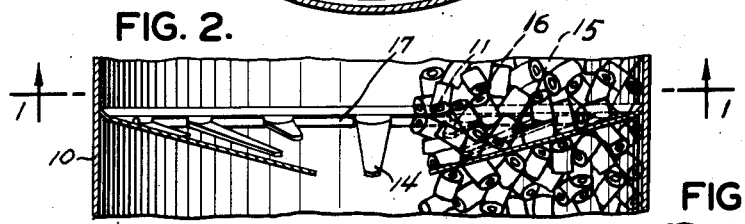
Fig. 2 is a broken vertical sectional view of a column having the invention installed therein, the parts appearing as on substantially the plane of line 2—2 of Fig. 1.
Figure 9:
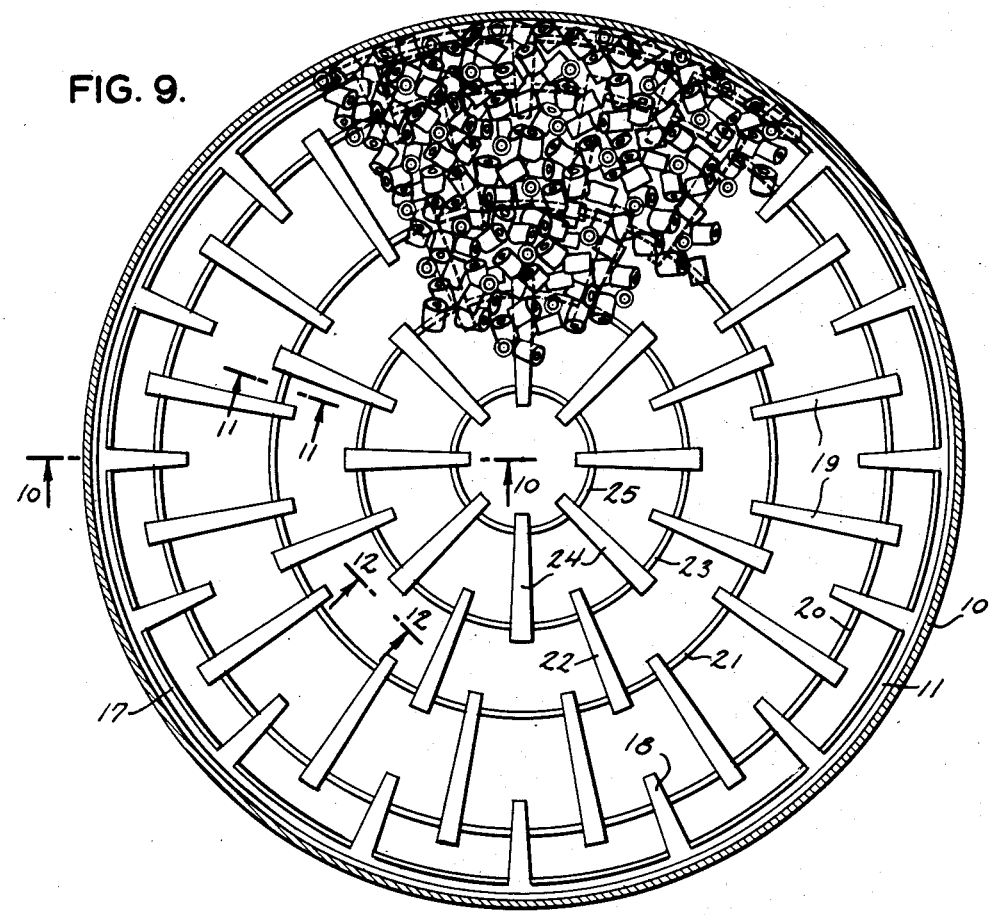
Fig. 9 is a horizontal cross sectional view similar to Fig. 1, illustrating a form of distributor for larger diameter columns with some intercepting and distributing vanes attached to the outer collecting ring and other vanes carried by and attached to intermediate supporting rings.
Figure 10:
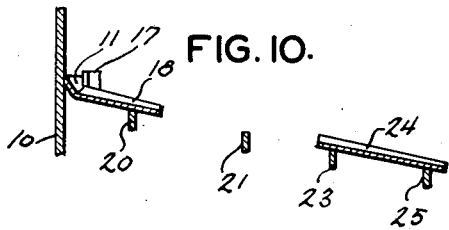
Figs. 10, 11 and 12 are broken sectional details of this modified form of construction as viewed on substantially the planes of 10—10, 11—11 and 12—12, respectively, of Fig. 9.
Figure 11:
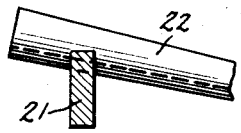
Figure 12:
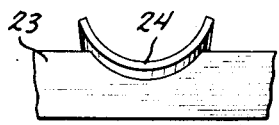

In Figs. 1, 2 and 9, a portion of a column without packing and which may be considered typical, is indicated at 10.

The distributors above referred to may be considered as involving the following elements: a collecting ring to collect liquid flowing down the column wall, inwardly extending intercepting and distributing vanes connected to the collecting ring to distribute liquid collected by the same and to distribute liquid intercepted in the column, and in some instances, as for large size columns, intercepting and distributing vanes not fastened to the collecting ring but located in the intermediate cross section of the column to distribute liquid intercepted in the column proper.

Considered in more detail, the invention comprises the provision of pickup or collecting rings such as illustrated at 11, at frequent intervals in the height of a column.

These collecting rings, plates or pans may be secured as by welding or fit in the column so as to leave no space at the column wall, and hence so as to collect all liquid flowing down that wall.

Figure 3:
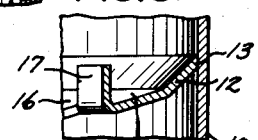
Fig. 3 is an enlarged broken sectional detail on substantially the plane of line 3—3 of Fig. 1, illustrating in particular a portion of the upstanding flange forming the collecting ring about the peripheral portion of the distributor.
Figure 4:
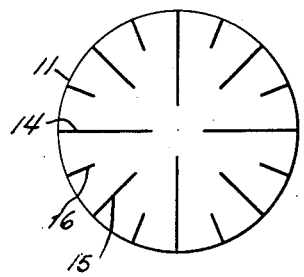
Figs. 4, 5, 6 and 7 are diagrammatic views showing how successive distributors may be rotated each a step to displace and offset the radial intercepting and distributing vanes or blades in a more or less uniform relation throughout the content of the tower.
Figure 5:
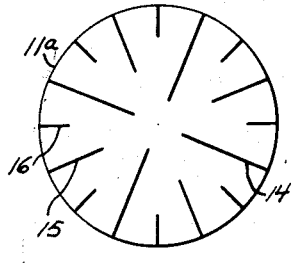

In Fig. 3 the collecting rings are shown formed with beveled rim flanges 12 and these with beveled edges 13 wedged in close, tight fitting engagement with the column wall.

These collecting rings in the first disclosed form of the invention, Figs. 1 to 8, are shown as carrying vanes or blades of different lengths projecting radially inwardly toward the center of the column. In Fig. 1 there are shown four equally spaced long vanes 14, with four intermediate length vanes 15 between them and shorter length vanes 16 between the long and intermediate length vanes.

As distinct from this the collector ring 11 for a larger size column, is shown in Fig. 9 as having sixteen equally spaced vanes 18, all of the same length, and a row of intermediate vanes 19 supported intermediate the outer vanes 18 on rings 20, 21, another row of vanes 22 between ring 21 and ring 23, and a third row of vanes 24 between ring 23 and the inner ring 25.

This structure can be designed to afford substantially uniform interception and distribution across a large diameter column and without requiring excessively long vanes, all to be carried by the collector ring.

The shorter length vanes such as 18, 19, 22 and 24, arranged in the alternating or staggered relation illustrated, intercept and distribute the flow, carrying the liquid always away from the wall toward the center of the column.

The outer supporting ring 20 is shown attached to the outer vanes 18 carried by the collector ring 11, and the other supporting rings 21, 23 and 25 may be connected as shown, as by welding or otherwise, only with the ends of the vanes 19, 22 and 24.

Figure 8:
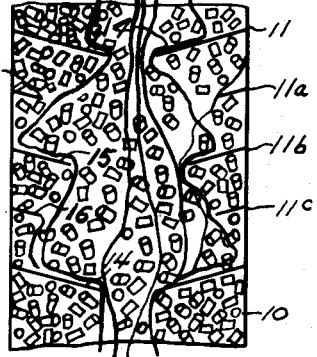
Fig. 8 is a diagram illustrating how, in a vertical section of the tower, the distributors indicated in Figs. 4, 5, 6 and 7, would appear with the relatively long, short and intermediate length vanes of different distributors alternating in order of arrangement.
Figure 6:
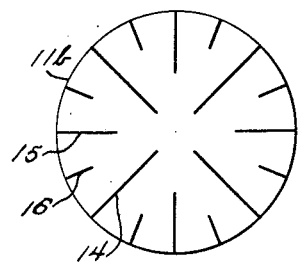
Figure 7:
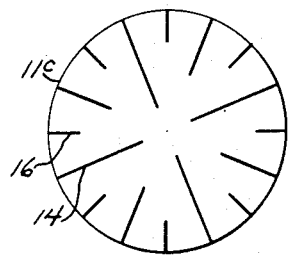

A preferred arrangement for the distributors shown in Fig. 1 is as illustrated in the diagrammatic views, with each successive distributor relatively rotated 22½ degrees in its placement in the column, as indicated by successive distributors 11, 11a, 11b, 11c, Figs. 4, 5, 6 and 7, to produce a pattern such as represented in Fig. 8, with substantially even or uniform distribution.

A preferred arrangement for the distributors indicated in Fig. 9 is likewise a 22½ degree rotation in placement in the column.

The vanes, disposed as indicated, will distribute evenly liquid collected by the collecting rings and will distribute evenly liquid intercepted in the column proper, the vanes in many cases acting in succession to accomplish these results.

Preferably the vanes slope downwardly toward the center and they may be of all the same or different inclinations.

The intimate contact of the collecting rings with the surrounding wall of the column assures that any downflow liquid on the wall will be collected and directed toward the distribution vanes, and to fully carry out this effect the collector rings are shown as having upstanding segmental annular flanges 17 between adjoining vanes or fingers for deflecting liquid caught in the tray portion 10 back of the flanges, laterally onto the downwardly inclined vanes.

The efficiency of the column is materially increased by this invention due to the improved distribution, as improved distribution results in better contact between the various phases in a column. Due to this increase in efficiency a shorter length of packed column can be used to produce an equivalent degree of separation or contacting as obtained with a longer packed column operating without this invention. This decrease in packed column height results in a lower holdup of material in the column, together with a lower pressure drop or difference in pressure across the column, both of these factors further improving the operation and utility of the column.

Also, the pattern or number of points of distribution in the column can be definitely determined by the number and location of the vanes.

The vanes are shown as tapering in width toward the center and as slightly concaved to accelerate downward and inward flow of liquid and prevent it from spilling too readily over the edges of the vanes.

The distributors may be made of various materials such as metal plate, wire screen cloth or ceramics, suited to conducting the liquid inwardly to the desired points of distribution.

When made of porous material such as screen or perforated plate, the distributors have the additional property of acting as contacting devices, thus further improving the efficiency of the column.

The size and location of the vanes may be varied according to the type of packing and the size of the column, but ordinarily the superficial area of the vanes should not be greater than that of the packing, so that the resistance of these distributors to the upflowing phase will not be excessive or objectionable.

Size and dimensions of the distributors may depend upon the amount of liquid flowing down the column, and similarly the vertical spacing may be governed accordingly. The size and spacing of the distributors may be equal along the full height of the column or may vary according to special requirements. Shape or location also may be varied, for example, the vanes may be curvilinear or angled in longitudinal extent or the vanes may be set so that the longitudinal axis coincides with a chord of the circle enclosing the column area, all so as to impart rotational or other directive effects.

The intimate contact of the collecting rings with the column wall may be effected by fusion to the wall, by tight fitting engagement therewith or otherwise, so that assuredly no liquid can pass between the ring and the wall.

The structure can be produced inexpensively and installed as required in columns designed for different purposes and with the various kinds of packing used in such columns.

What is claimed is:

A packed column having distributors in vertically spaced superposed relation, said distributors having collecting rings in intimate engagement with the column wall to collect any liquid running down said wall and having vanes radially inclined to the horizontal extending from these collecting rings to distribute evenly liquid collected by the rings together with liquid intercepted by these vanes and the packed column having further vanes radially inclined to the horizontal located in even order across the area of the column, means for indirectly attaching said further vanes to said collecting rings for support thereby in circumferentially staggered relation to said first named vanes, the latter vanes radially inclined and serving as intermediate interceptors and distributors of liquid in the column proper.

PETER N. HEERE.

References Cited in the file of this patent

UNITED STATES PATENTS

| Number | Name | Date |
| --- | --- | --- |
| 2,007,759 | Harmon | July 9, 1935 |
| 2,104,315 | Abramson | Jan. 4, 1938 |
| 2,277,840 | Berl | Mar. 31, 1942 |
| 2,408,290 | Byer | Sept. 24, 1946 |

FOREIGN PATENTS

| Number | Country | Date |
| --- | --- | --- |
| 218,768 | Great Britain | July 17, 1924 |